United States Patent [19]

Dehar

[11] 3,832,074

[45] Aug. 27, 1974

[54] LINKAGE QUICK-CONNECT DEVICE

[75] Inventor: David C. Dehar, Dearborn Heights, Mich.

[73] Assignee: Ford Motor Company, Dearborn, Mich.

[22] Filed: July 25, 1973

[21] Appl. No.: 382,624

[52] U.S. Cl. ............................................. 403/163
[51] Int. Cl. ......................................... F16c 11/00
[58] Field of Search ............ 403/162, 163, 397, 71, 403/69, 67; 74/512, 513

[56] References Cited
UNITED STATES PATENTS
3,231,300  1/1966  Moroney............................ 403/163
3,233,930  2/1966  Becker............................... 403/163

*Primary Examiner*—Geo. V. Larkin
*Attorney, Agent, or Firm*—Keith L. Zerschling; John J Roethel

[57] ABSTRACT

A linkage quick-connect device for coupling a threaded link rod to a lever member having an aperture therein. The quick-connect device comprises a swivel pin having a cylindrical head and a shank, the latter being adapted to have snap-fit into the aperture in the lever and to be retained therein. The swivel pin is axially slotted through its head into the shank, the slot terminating short of the shank end remote from the cylindrical head whereby the symmetrical body portions are hingedly connected for flexing movement toward and away from each other. The cylindrical head has a cylindrical recess extending in a direction normal to the swivel pin axis and has gripping means engageable with the threaded link rod to prevent axial disengagement of the latter from the swivel pin head in a direction axially of the longitudinal axis of the link rod.

4 Claims, 4 Drawing Figures

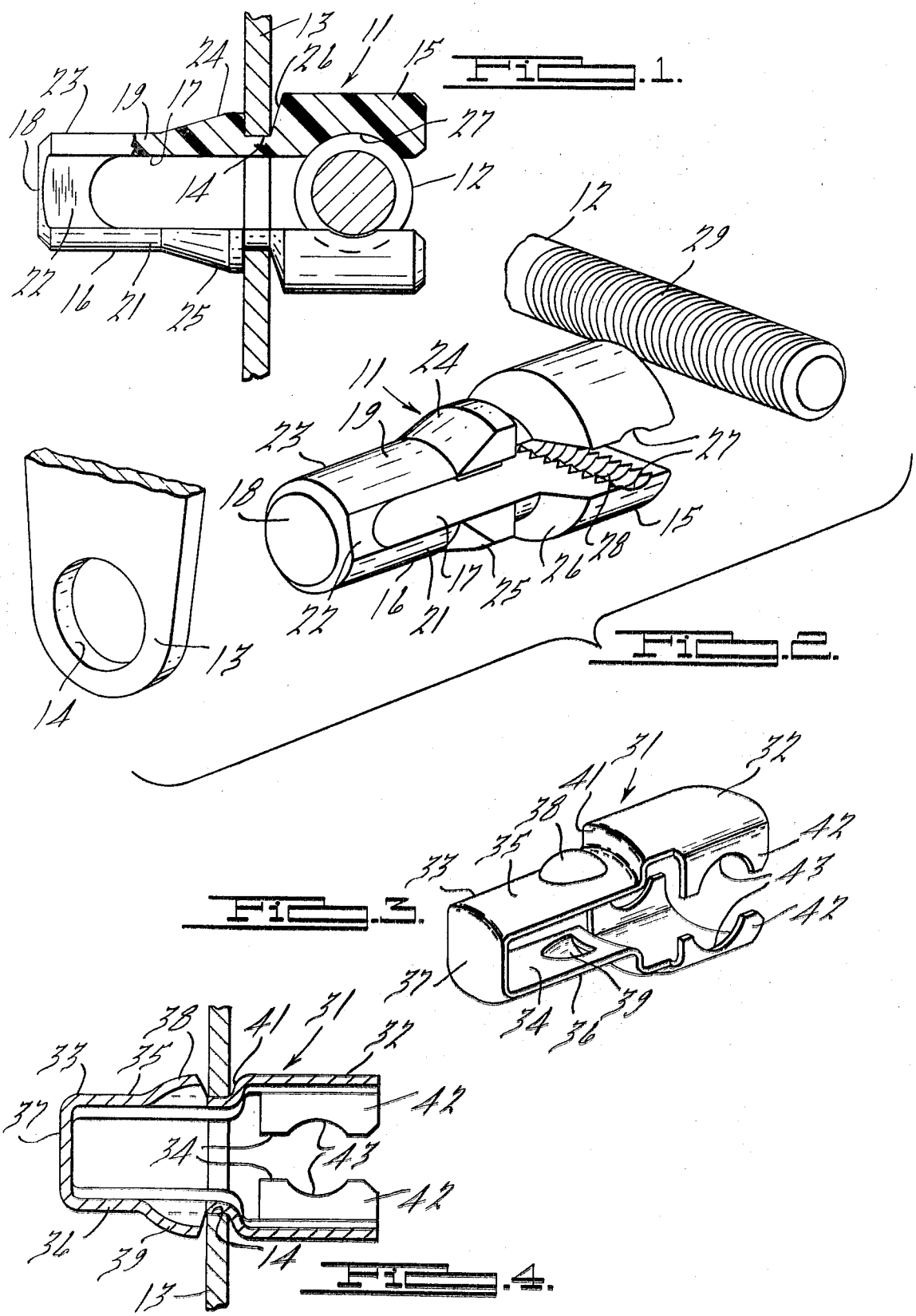

LINKAGE QUICK-CONNECT DEVICE

BACKGROUND OF THE INVENTION

Reference is made to U.S. Pat. No. 3,231,300 issued on Jan. 25, 1966 to W. N. Moroney for "Connecting Means". This patent is exemplary of a number of patents showing devices for connecting an operating rod to a lever. Although provision is made for a quick-coupling action which involves a snap-fit of the rod into a cylindrical recess in the head of the connecting device, it will be readily apparent that no provision is shown for longitudinal adjustment of the rod to make certain that the L-shaped end of the rod will be in alignment with the hole in the quick-connect coupler. This usually is accomplished by providing threads and adjusting nuts on the other end of the rod. With the adjusting nut arrangement, inevitable manipulation is required to ensure that the link is adjusted to the right length so that it fits into the coupling device and provides for proper movement of the lever to be operated.

It is an object of the present invention to provide a connecting means that allows a connecting link to be made rapidly without requiring any adjustment.

SUMMARY OF THE INVENTION

The present invention relates to a linkage quick-connect device for coupling a threaded link rod to a lever member having a circular aperture therein. The quick-connect device comprises a swivel pin having a substantially cylindrical head of a diameter greater than the diameter of the circular aperture in the lever and an axially-extending shank. A slot extends lengthwise of the swivel pin through the head toward the end of the shank remote from the head to provide spaced symmetrical body portions. The slot terminates short of the remote end of the shank to form a hinge connection between the body portions. The shank is provided with outwardly projecting, axially extending, tapered projections on its exterior. The tapered projections provide retention means having a retention diameter greater than the diameter of the circular aperture. The projections are axially spaced from the head to accommodate the thickness of the lever between the projections and the underside of the head.

The body portions are resiliently flexible toward each other about the hinge portion to permit passage of the tapered projections through the lever aperture when it is desired to assemble the swivel pin to the lever. The body portions at the passage of the projections thereon through the aperture are resiliently restorable to spaced relationship for retention on the lever by the retention projections and the head to prevent axial disconnection of the swivel pin from the lever.

The head is provided with recess means to receive the link rod, the recess means extending generally normal to the axis of the swivel pin and being of a diameter greater than the width of the slot portion through the head. The slot is temporarily expandable upon forced passage of the link rod axially of the swivel pin into the recess means. Gripping means on the recess walls engage the threads on the link rod to prevent displacement in a direction axially of the rod and normal to the axis of the swivel pin.

DESCRIPTION OF THE DRAWING

Other advantages of this invention will become more apparent as this description proceeds, particularly when considered in connection with the accompanying drawing, wherein:

FIG. 1 is a view in part sectional illustrating the swivel pin, the lever and the actuating rod assembled together;

FIG. 2 is an exploded view in perspective illustrating the quick-connect device embodying the present invention in relationship to a lever and a threaded rod;

FIG. 3 is a perspective view of a swivel pin made of spring steel as compared to the previous embodiment in which the swivel pin was a molded plastic part; and FIG. 4 is a view illustrating the FIG. 3 swivel pin assembled to a lever.

DETAILED DESCRIPTION OF THE INVENTION

Referring now to the drawing, FIGS. 1 and 2 illustrate a first embodiment of the quick-connect device of this invention. The quick-connect device comprises a swivel pin, generally designated 11, molded from a resilient plastic material such as nylon or Delrin. The swivel pin 11 has the function of coupling a threaded link rod 12 to a lever member 13 having a circular aperture 14 therein.

The swivel pin 11 has a substantially cylindrical head 15 of a diameter greater than the diameter of the circular aperture 14 and an axially extending shank 16. The swivel pin 11 is molded with a slot 17 extending lengthwise through the head 15 toward the end 18 of the shank 16 remote from the head 15, thus forming two symmetrical body portions 19 and 21. The slot 17 terminates short of the end 18 of the shank 16 to form a hinge connection 22 between the body portions.

The remote end 18 of the shank 16 has a chamfered cylindrical pilot portion 23 to guide the shank 16 through the lever aperture 14 during the assembly of the two units.

Outwardly projecting, axially extending, tapered projections 24 and 25 on the exterior of the shank 16 provide retention means having a functional or projected diameter greater than the diameter of the lever member aperture 14. The projections 24–25 are axially spaced from the base 26 of the head 15 to accommodate the metal thickness of the lever 13.

In normal usage, the swivel pin 11 is preassembled to the lever member 13. This is done by inserting the pilot portion 23 into the aperture 14 in the lever member 13 and axially forcing the swivel pin through the aperture 14 until the head 15 obstructs further insertion. The body portions 19 and 21 of the swivel pin will be resiliently flexed toward each other about the hinge portion 22 to permit passage of the tapered projections 24–25 through the lever aperture. The body portions 19–21 after passage of the projections 24–25 through the aperture 14 are resiliently restored to their original spaced relationship and are retained on the lever 13 by the retention projections 24–25 on the one side and the head 15 on the other which function to prevent axial disconnection of the swivel pin from the lever.

The head 15 is provided with a cylindrical recess 27 that extends generally normal to the axis of the swivel pin 16 and has a diameter greater than the width of the slot 14 through the head, the slot 17 being expandable upon forced passage of the link rod 12 in a direction axially of the swivel pin into the recess 27. It will be understood that the axis of the rod 12 is maintained substantially parallel to the axis of the cylindrical recess 27, i.e., normal to the axis of the swivel pin 16, during assembly.

The walls of the recess 27 are formed with gripping means shown as partial threads 28. Although shown as threads 28 adapted to engage equivalent threads 29 on the rod 12, it will be apparent that the term "threads" could apply to coacting serrations or corrugations adapted to prevent movement of the rod 12 relative to the head 15 when assembled.

It will be noted that the base 26 of the head 15 is angularly inclined away from the surface of the lever 13 to permit the head portions separated by the slot 17 to flex as the threaded end 31 of the rod is forced into the recess 27. Upon the rod end 31 being aligned with the threads of the recess, the head portions will snap toward each other tightly gripping the rod to prevent displacement in a direction axially of the rod and normal to the axis of the swivel pin.

The embodiment of the invention disclosed in FIGS. 3 and 4 is functionally similar to the above described embodiment. In this embodiment, the swivel pin, herein designated 31, is formed of spring steel instead of being molded of plastic material. It has a substantially cylindrical head 32 in a shank 33. A slot 34 extends longitudinally of the swivel pin 31 dividing the latter into two symmetrical body portions 35 and 36 connected by a hinge portion 37 at the end of the shank remote from the head 32.

Outwardly projecting, axially extending, tapered projections 38 and 39 on the exterior of the shank 33 serve as retention means having a projected or functional diameter greater than the diameter of the lever aperture 14. The projections 38 and 39 are axially spaced from the base 41 of the head 32 to accommodate the metal thickness of the lever 13.

In FIG. 4 the swivel pin 31 is shown assembled to the lever 13. This is accomplished by aligning the shank 33 of the swivel pin with the aperture 14 in the lever and then axially forcing the swivel pin through the aperture 14 so that the projections 38 and 39 resiliently force the body portions 35–36 toward each other thus decreasing the functional diameter of the projections 38–39. The body portions 35–36 after the passage of the projections thereon through the aperture 14 are resiliently restored to their normal spaced relationship and the swivel pin is retained on the lever by the retention projections 38–39 coacting with the head 32 to prevent axial disconnection of the swivel pin from the lever.

In the present embodiment the equivalent to a cylindrical recess, such as the recess 27 of the previously described embodiment, for receiving the threaded link rod 12 is formed by tabs 42 located at opposite sides of the head 32. The tabs 42 are notched at 43 to receive the rod 12 and the edges of the notches function as threads for gripping and holding the assembled rod against withdrawal in a direction axially of the rod.

As in the previously described embodiment the rod is assembled by forcing it into the slot 34 axially of the swivel pin into the notches 43. The edges of the notches engage the threads on the link rod to prevent displacement in a direction axially of the rod and normal to the axis of the swivel pin.

It is to be understood that the forms of the invention are not to be limited to the exact constructions shown and described but that various changes and modifications may be made without departing from the spirit and scope of the invention as defined in the appended claims.

What is claimed is:

1. A linkage quick-connect device for coupling a threaded link rod to a lever member having a circular aperture therein, the quick-connect device comprising:

a swivel pin having a substantially cylindrical head of a diameter greater than the diameter of the circular aperture and an axially extending shank, a slot extending lengthwise of the swivel pin through the head toward the end of the shank remote from the head to provide spaced symmetrical body portions, the slot terminating short of the remote end of the shank to form a hinge connection between the body portions, outwardly projecting, axially extending, tapered projections on the exterior of the shank providing retention means having a diameter greater than the diameter of the circular aperture, the projections being axially spaced from the head to accommodate the thickness of the lever, the body portions being resiliently flexible toward each other about the hinge portion to permit passage of the tapered projections through the lever aperture, the body portions after passage of the projections thereon through the aperture being resiliently restorable to spaced relationship whereby the swivel pin is retained on the lever between the retention projections and the head which prevent axial disconnection of the swivel pin from the lever, the head having recess means to receive the link rod, the recess means extending generally normal to the axis of the swivel pin and being of a diameter greater than the width of the slot through the head, the slot being temporarily expandable upon forced passage of the link rod axially of the swivel pin into the recess means, and gripping means on the recess walls engaging the threads on the link rod to prevent displacement in a direction axially of the rod and normal to the axis of the swivel pin.

2. A linkage quick-connect device according to claim 1, in which:

the swivel pin is molded of a resilient plastic, and the gripping means comprises a plurality of threads molded in the wall of the recess means.

3. A linkage quick-connect device according to claim 1, in which:

the swivel pin is formed of spring steel, and the gripping means comprises thread-like elements at each end of the recess means adapted to coact with the threads on the link rod to hold the latter against axial displacement.

4. A linkage quick-connect device according to claim 1, in which:

the swivel pin is molded of a resilient plastic, and the recess means is cylindrical and has a plurality of threads molded into the wall thereof adapted to coact with the threads on the link rod to hold the latter against displacement in the direction of its longitudinal axis.

* * * * *